United States Patent
Huschenbett

(10) Patent No.: US 11,120,653 B2
(45) Date of Patent: Sep. 14, 2021

(54) ACCESS DEVICE FOR A VEHICLE (AS AMENDED)

(71) Applicant: Continental Automotive GmbH, Hannover (DE)

(72) Inventor: Matthias Huschenbett, Regensburg (DE)

(73) Assignee: Continental Automotive GmbH

( * ) Notice: Subject to any disclaimer, the term of this patent is extended or adjusted under 35 U.S.C. 154(b) by 0 days.

(21) Appl. No.: 16/463,004

(22) PCT Filed: Nov. 16, 2017

(86) PCT No.: PCT/EP2017/079431
§ 371 (c)(1),
(2) Date: May 22, 2019

(87) PCT Pub. No.: WO2018/095798
PCT Pub. Date: May 31, 2018

(65) Prior Publication Data
US 2020/0066078 A1     Feb. 27, 2020

(30) Foreign Application Priority Data

Nov. 24, 2016  (DE) .................... 10 2016 223 252.5

(51) Int. Cl.
*G07C 9/00* (2020.01)
*E05B 19/00* (2006.01)

(52) U.S. Cl.
CPC ...... *G07C 9/00658* (2013.01); *E05B 19/0011* (2013.01); *G07C 2009/00198* (2013.01); *G07C 2009/00642* (2013.01)

(58) Field of Classification Search
CPC ...... G07C 9/00658; G07C 2009/00198; E05B 19/0011; G01C 21/362; G08G 1/096; H04W 4/027; H04W 4/40
(Continued)

(56) References Cited

U.S. PATENT DOCUMENTS 6,552,649 B1    4/2003 Okada et al.
6,778,065 B1    8/2004 Asakura et al.
(Continued)

FOREIGN PATENT DOCUMENTS

CN    1701154 A    11/2005
CN    101280649 A   10/2008
(Continued)

OTHER PUBLICATIONS

International Search Report and Written Opinion for International Application No. PCT/EP2017/079431, dated Feb. 2, 2018—9 pages.
(Continued)

*Primary Examiner* — Vernal U Brown
(74) *Attorney, Agent, or Firm* — RatnerPrestia

(57) ABSTRACT

An access apparatus (ZV) for a vehicle (FZ) has a vehicle-side position-determining device (PBE) for determining the position (POS1, POS2, POS3) of a mobile identification signal generator (IDG) with respect to the vehicle. In addition, said access apparatus (ZV) has a vehicle-side control device (STE) for emitting location-determining signals (LS1) to the mobile identification signal generator (IDG) for determining the position thereof. In this context, the vehicle-side control device (STE) is configured to control the frequency of the emission of the location-determining signals as a function of the position of the mobile identification signal generator with respect to the vehicle. In this way, the power consumption both in the vehicle and in the identification signal generator can be reduced on the basis of the location-dependent adaptation of the emission of the interrogation signals, without adversely affecting reliable operation of the access apparatus.

9 Claims, 2 Drawing Sheets

(58) Field of Classification Search
USPC .................................................... 340/5.61
See application file for complete search history.

(56) References Cited

U.S. PATENT DOCUMENTS

| | | | |
|---|---|---|---|
| 7,489,231 B2 | 2/2009 | Kadouchi et al. | |
| 8,532,576 B2 | 9/2013 | Kawamura et al. | |
| 8,935,052 B2 | 1/2015 | Hermann | |
| 9,199,610 B2* | 12/2015 | Nakashima | B60R 25/24 |
| 9,607,460 B2 | 3/2017 | Yamane et al. | |
| 10,207,678 B2 | 2/2019 | Khan et al. | |
| 2005/0258936 A1* | 11/2005 | Ghabra | B60R 25/245 |
| | | | 340/5.72 |
| 2011/0298580 A1 | 12/2011 | Nakashima et al. | |
| 2014/0308971 A1* | 10/2014 | O'Brien | H04W 4/023 |
| | | | 455/456.1 |
| 2014/0375420 A1 | 12/2014 | Seiberts et al. | |
| 2015/0161834 A1* | 6/2015 | Spahl | H04W 4/021 |
| | | | 340/5.61 |
| 2017/0019480 A1 | 1/2017 | Yokota et al. | |
| 2017/0050618 A1* | 2/2017 | Lickfelt | B60R 16/03 |

FOREIGN PATENT DOCUMENTS

| | | |
|---|---|---|
| CN | 103946899 A | 7/2014 |
| DE | 10064141 A1 | 7/2002 |
| DE | 102008008089 A1 | 8/2009 |
| DE | 102011013605 A1 | 9/2012 |
| DE | 102011088917 A1 | 6/2013 |
| DE | 102014216838 A1 | 4/2015 |
| EP | 2806406 A2 | 11/2014 |
| KR | 20110100157 A | 9/2011 |
| WO | 2009095281 A1 | 8/2009 |
| WO | 2014191551 A1 | 12/2014 |
| WO | 2014191572 A1 | 12/2014 |
| WO | 2015155875 A1 | 10/2015 |

OTHER PUBLICATIONS

Korean Office Action for Korean Application No. 10-2019-7017514, dated Aug. 3, 2020, with translation, 11 pages.
Chinese Office Action for Chinese Application No. 201780072973.8, dated Dec. 3, 2020, with translation, 19 pages.
Korean Notice of Decision for Rejection for Application No. 10-2019-7017514, dated Apr. 9, 2021 with translation, 7 pages.

* cited by examiner

ACCESS DEVICE FOR A VEHICLE (AS AMENDED)

CROSS REFERENCE TO RELATED APPLICATIONS

This application is the U.S. National Phase Application of PCT International Application No. PCT/EP2017/079431, filed Nov. 16, 2017, which claims priority to German Patent Application No. 10 2016 223 252.5, filed Nov. 24, 2016, the contents of such applications being incorporated by reference herein.

FIELD OF THE INVENTION

The present invention relates to an access device for a vehicle and to a vehicle having such an access device. Furthermore, it relates to a method for operating an access device for a vehicle.

BACKGROUND OF THE INVENTION

In order to prevent unauthorized access to a vehicle, particularly a motor vehicle, modern access authorization systems or access devices in vehicles use electronic security systems in which, in order to authenticate the user, a data communication takes place between a first communication device of the vehicle and a second communication device in a mobile identification transmitter of the user, such as a key or key fob. In this case, the mobile identification transmitter in an active entry arrangement transmits control signals and an identification code to the vehicle, for example as a result of an appropriate button being pressed by the user of the mobile identification transmitter, after which the vehicle is unlocked or locked if the identification code is correct.

In the case of a so-called passive access device, firstly a first communication device of the vehicle emits, at predetermined regular time intervals, interrogation signals or localization signals with a specific field strength in order to check whether a mobile identification transmitter is located in an approach range around the vehicle. If a mobile identification transmitter is approaching the vehicle and can finally receive its interrogation signals, it will respond to the reception of an interrogation signal in order to initiate an authentication process and in order to be able to determine the position of the mobile identification transmitter with respect to the vehicle. For the authentication, data telegrams are exchanged in which ultimately the mobile identification transmitter transmits its authentication code to the vehicle. If the authentication code is checked successfully, it is then possible for a user who is located directly at the vehicle to initiate unlocking of the corresponding vehicle door or of all the vehicle doors by actuating a door handle. Since this requires no active actuation of a mechanical or electrical identification transmitter or of a key to be performed by a user, this type of entry authorization is also referred to as a passive entry authorization check, and the corresponding entry authorization systems are referred to as passive electronic entry authorization systems.

It proves disadvantageous with such passive access devices that for regular checking of the position of the mobile identification transmitter with respect to the vehicle the interrogation signals or localization signals generally have to be emitted at short time intervals, i.e. at a high rate, in order to ensure smooth operation of the passive access device. However, this gives rise to high power consumption both in the vehicle for the emission of the interrogation signals or localization signals, and also in the mobile identification transmitter during the processing of the received signals and during the emission of the response signals.

SUMMARY OF THE INVENTION

An aspect of the present invention is therefore a possible way of ensuring reliable operation of an access device with minimized power consumption.

In this context, according to a first aspect of the invention, an access device for a vehicle having the following features is provided. Said access device has a vehicle-side position-determining device for determining the position of a mobile identification transmitter with respect to the vehicle by means of localization signals. In addition, said access device has a vehicle-side control device for emitting the localization signals to the mobile identification transmitter for determining the position thereof, wherein the vehicle-side control device is configured to control the frequency of the emission of the localization signals in accordance with the position of the mobile identification transmitter with respect to the vehicle. As a result of this control of the frequency of the emission of the localization signals in accordance with the position of the identification transmitter with respect to the vehicle, the emission of the localization signals does not have to take place at a constant and a high rate, but instead it can be operated in a situation-dependent fashion (position-dependent fashion). In this way, the power consumption can be reduced not only in the vehicle but also in the identification transmitter, without having to accept any losses in respect of the performance capability of the access device.

According to one refinement of the invention, the vehicle-side control device can be configured to control the frequency of the emission of the localization signals in accordance with the distance between the mobile identification transmitter and the vehicle. In particular, the vehicle-side control device can be configured here in such a way that it increases the frequency of the emission of the localization signals the shorter the distance between the identification transmitter and the vehicle, or reduces it as the distance increases. In other words, in the case of an identification transmitter which is located close to the vehicle, the frequency of the emission of the localization signals is to be increased in order, for example, to be able to react to a possibly directly following unlocking request by a user or driver, while in the case of an identification transmitter which is located far away from the vehicle, only a low frequency of the emission of the interrogation signals is necessary.

According to a further refinement of the invention, the vehicle-side control device is configured to control the frequency of the emission of the interrogation signals in accordance with the time for which the mobile identification transmitter is present at a specific location or at a specific position. This means that if the identification transmitter is present at the same position for, for example, several seconds or even minutes, it can be assumed that, for example, it is being currently prevented from proceeding to the vehicle because, for example, the user carrying the mobile identification transmitter has just met another person, in order to conduct a conversation with said person. In order to avoid using an unnecessarily large amount of power for the emission of the localization signals, the vehicle-side control device can reduce the frequency of the emission of the localization signals further the longer the time which the mobile identification transmitter remains at the same position. In this way, power is saved both on the vehicle side and on the mobile identification transmitter side.

According to a further refinement, the vehicle-side control device is configured to control the frequency of the emission of the localization signals in accordance with a change in the position of the mobile identification transmitter. It is conceivable here that when any kind of change in the position is implemented, the vehicle-side control device switches over from a minimum frequency of the emission of the localization signals in a stationary state of the mobile identification transmitter to a maximum frequency as soon as a change in position of the mobile identification transmitter is detected. Is also conceivable that the vehicle-side control device is configured to control the frequency of the emission of the localization signals in accordance with a determined speed of change of the position of the mobile identification transmitter. This may be appropriate, in particular, if the change in position is associated with approaching the vehicle, with the result that the frequency of the emission of the localization signals is increased to a greater extent the higher the speed at which the mobile identification transmitter approaches in the direction of the vehicle. In this way, the power consumption can be reduced not only in the vehicle but also in the identification transmitter, without having to incur any losses in respect of the performance capability of the access device itself.

According to a further refinement of the access device, the vehicle-side control device emits, for the determination of the position of the mobile identification transmitter a localization signal, and receives a response signal from the mobile identification transmitter, which response signal contains a value which permits the reception field strength of the localization signal, measured at the location of the mobile identification transmitter to be inferred. This means that with this possible way of determining positions, a multiplicity of localization signals is emitted with a predetermined (in particular the same) intensity, for example at predetermined time intervals, and the intensity value or RSSI (RSSI: received signal strength indication) value of a respective localization signal from the mobile identification transmitter is determined at the location of the mobile identification transmitter, and the determined intensity value of a respective interrogation signal is transmitted with the response signal to the vehicle. The localization signals can be here low-frequency signals (for example at 125 kHz), and the respective response signals can be high-frequency signals (for example at 433 MHz). It is also conceivable that both localization signals and response signals are emitted according to a Bluetooth standard. This method of field strength determination ensures a simple and reliable possible way of determining the position of the mobile identification transmitter with respect to the vehicle.

According to a further refinement of the access device, the vehicle-side control device carries out a position determination of the mobile identification transmitter on the basis of a transit time measurement, for example by measuring the time from the emission of a localization signal until the arrival of a response signal. In particular, the vehicle-side control device can carry out the transit time measurement by means of a radio-based UWB (ultra-wideband) transmission. This likewise provides a reliable possible way of determining positions.

For the determination of positions by means of UWB, the vehicle emits UWB signals (short UWB pulses) by means of correspondingly suitable UWB antennas, which UWB signals are received by a mobile identification transmitter and transmitted back again to the UWB antennas of the vehicle. The transit time which is required to travel along the distance between the vehicle or the UWB antennas to the mobile identification transmitter is therefore measured in the vehicle by the vehicle-side control device, and the vehicle-side position-determining device can therefore determine the position or the distance of the vehicle with respect to the mobile identification transmitter on the basis thereof.

According to a further refinement of the invention, the vehicle-side control device is also configured to trigger a predetermined vehicle function in accordance with the position of the mobile identification transmitter with respect to the vehicle, the change in position of the mobile identification transmitter and/or the time for which the mobile identification transmitter is present at a specific location. Such vehicle functions can be here "welcome lighting" which causes a lighting device of the vehicle to be activated if a user has approached the vehicle with the mobile identification transmitter and is located at a specific distance, or less, with respect to the vehicle. In addition, there can be a so-called "approach unlock" function (automatic unlocking when the vehicle is approached), wherein a user who is carrying the mobile identification transmitter or one of said transmitters will automatically unlock the nearest door on approaching. Finally, it is also conceivable for such a vehicle function to comprise so-called "walk-away locking" during which the vehicle or the doors thereof are locked automatically if a user moves away from the vehicle with his identification transmitter by further than a predetermined distance.

According to a further refinement, the vehicle-side control device can be configured to authenticate the mobile identification transmitter, and in this respect said control device serves to emit an interrogation signal to the mobile identification transmitter and to receive an identification code from the identification transmitter. If the identification code which is transmitted by the mobile identification transmitter corresponds to an identification code stored in the vehicle or in the vehicle-side control device, the mobile identification transmitter is identified as being correct. It is conceivable here that this correct identification is used for ensuring that the above-mentioned emission of localization signals or the adaptation of the frequency of the emission of the localization signals takes place only if a correct mobile identification transmitter has previously been detected.

According to a second aspect of the invention, a vehicle comprising an access device according to the above presentation or a configuration thereof is provided.

Finally, according to a third aspect a method for operating an access device for a vehicle having the following steps is provided. Localization signals are emitted by the vehicle for determining the position of a mobile identification transmitter. Furthermore, the position of the mobile identification transmitter is determined on the basis of a response of the mobile identification transmitter to a localization signal. Finally, the frequency of the emission of the localization signals is adapted in accordance with the position of the mobile identification transmitter with respect to the vehicle. This provides a possible way of reducing the power consumption of an access device without disadvantages with respect to reliable functioning.

According to one refinement of the method, the frequency of the emission of the localization signals is controlled or adapted in accordance with the time for which the identification transmitter is present at a specific position.

According to a further refinement, the frequency of the emission of the localization signals is controlled or adapted in accordance with a change in the position of the mobile identification transmitter. In this context, the frequency of the emission of the localization signals can be implemented in accordance with the speed at which the mobile identification transmitter changes its position.

Advantageous refinements of the access device, in so far as applicable to the vehicle and the method, are also to be regarded as advantageous configurations of the vehicle and of the method, and vice versa.

BRIEF DESCRIPTION OF THE DRAWINGS

In the section which follows, exemplary embodiments of aspects of the present invention will now be explained in more detail with reference to the accompanying drawings.

In which.

DETAILED DESCRIPTION OF THE PREFERRED EMBODIMENTS

Figure 1:
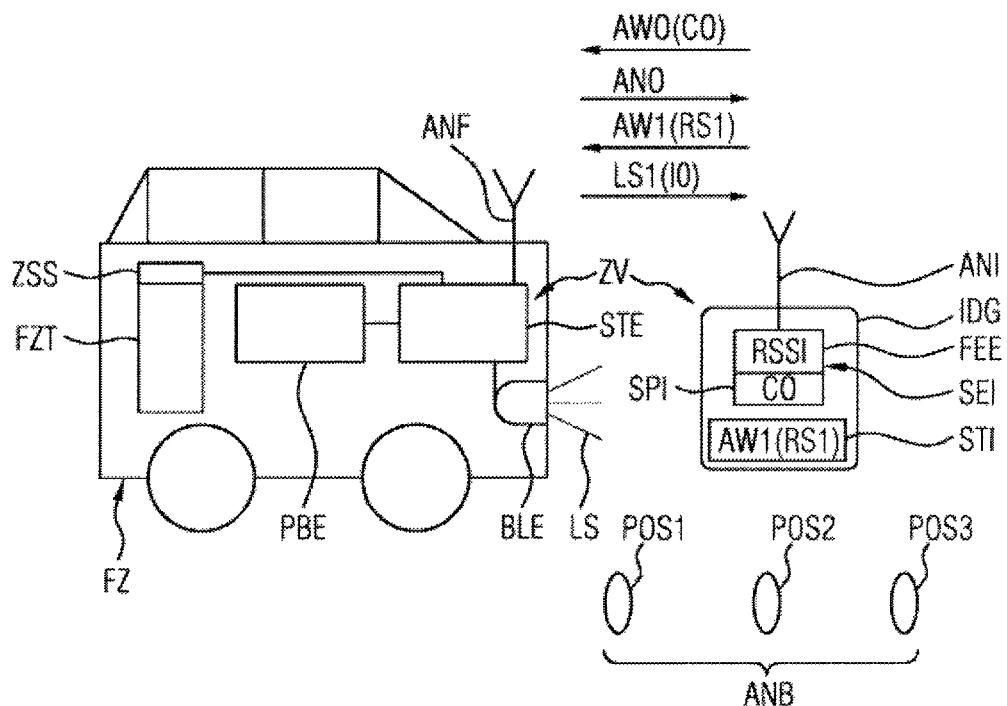
FIG. 1 shows a schematic illustration of a vehicle comprising an access device according to one embodiment of the invention.

Reference will first be made to FIG. 1, which shows a vehicle FZ with an access device ZV according to an embodiment of the invention. The vehicle FZ here has a vehicle door FZT which can be unlocked or locked by means of a central locking system ZSS. Furthermore, the vehicle FZ comprises vehicle-side components of the access device ZV. Primarily, this is a vehicle-side control device STE which is configured to transmit radio signals to a mobile identification transmitter IDG and receive response signals therefrom. For this purpose, the vehicle-side control device STE is connected to a vehicle-side antenna ANF, which can also have a plurality of partial antennas. In this context, the control device STE can emit, via the antenna ANF, for example a low-frequency interrogation signal ANO to the identification transmitter IDG, which responds to this interrogation signal ANO with a response signal AWO which contains an identification code CO of the identification transmitter IDG.

In addition to the signals just mentioned for an authentication process, further signals for determining the position of the identification transmitter IDG with respect to the vehicle FZ can be exchanged between the vehicle FZ and the identification transmitter IDG. In this context, the control device STE can emit, via the antenna ANF one or more low-frequency localization signals LS1 whose field strength is measured at the location of the identification transmitter and is sent back in the form of a field strength value RS1 with a corresponding response signal AW1 from the identification transmitter to the vehicle. Taking as a starting point the fact that the received field strength of a localization signal decreases as the distance increases, the field strength value RS1 which is transmitted with the response signal AW1 can represent a measure of the distance between the identification transmitter IDG and the vehicle.

While the communication of a single antenna ANF with the identification transmitter IDG makes it possible to determine a distance between the identification transmitter IDG and this antenna, it is also conceivable to permit more precise determination of the position of the identification transmitter IDG with respect to the vehicle FZ in that, in addition to the antenna ANF, a further vehicle-side antenna is used to emit localization signals. The location of the identification transmitter can then be determined more precisely by means of corresponding triangulation method. One antenna or even a plurality of additional antennas for improved determination of positions are conceivable, but not illustrated in FIG. 1 for reasons of clarity.

The vehicle-side control device STE is also connected to the central locking system ZSS, with the result that the control device STE can unlock or lock the vehicle door FZT via the central locking system ZSS. A precondition for unlocking is that the identification code CO which is transmitted to the vehicle by the identification transmitter IDG corresponds to a code which is stored in the vehicle-side control device STE. In this case, the identification transmitter IDG is to be considered the correct identification transmitter, with the result that a user who carries this identification transmitter on his person can enter the interior of the vehicle or the passenger compartment with the correct identification transmitter. A further (additional) precondition for unlocking of the vehicle door FZT can be that the identification transmitter IDG is also located at the correct position with respect to the vehicle or within a specific distance around the vehicle. In other words, it is conceivable that a vehicle door FZT can be unlocked by the control device STE, for example, only when the identification transmitter IDG is located within a predetermined distance around the vehicle or within a predetermined distance with respect to a vehicle door.

It is also conceivable that automatic unlocking of the vehicle door FZT occurs only when, primarily, the identification code CO has been registered as correct and, in addition, the direction of movement runs in the direction of the vehicle FZ.

For the determination of positions, the vehicle-side control device STE is connected to a vehicle-side position-determining device PBE which receives, from the vehicle-side control device STE, the field strength values RS1, received via one or more vehicle antennas ANF, of an identification transmitter IDG, and can infer the position of the mobile identification transmitter IDG therefrom through knowledge of the mounting location of the one or more antennas on the vehicle.

In order to communicate with the mobile identification transmitter IDG of the vehicle FZ, the identification transmitter has an identification-transmitter-side transceiver device SEI with a field strength-sensing device FEE, which receives the corresponding localization signals LS1 (as well as interrogation signals ANO) via an identification-transmitter-side antenna ANI, wherein the field strength-sensing device FEE determines the field strength value RSSI of the localization signal LS1 and passes on the said field strength value RSSI to the identification-transmitter-side control device STI. The latter generates therefrom a response signal AW1 which contains a value corresponding to the sensed field strength or a value RS1 derived therefrom. As mentioned above, this response signal AW1 is then sent back to the vehicle, particularly as a high-frequency signal, via the identification-transmitter-side antenna ANI.

As also mentioned above, the identification transmitter IDG receives, for authentication with respect to the vehicle, an interrogation signal ANO, in response to which the identification-transmitter-side control device STI retrieves the identification code CO from a memory SPI and in turn sends it back, in particular as a high-frequency signal, in the response signal AWO to the vehicle FZ.

Figure 2:
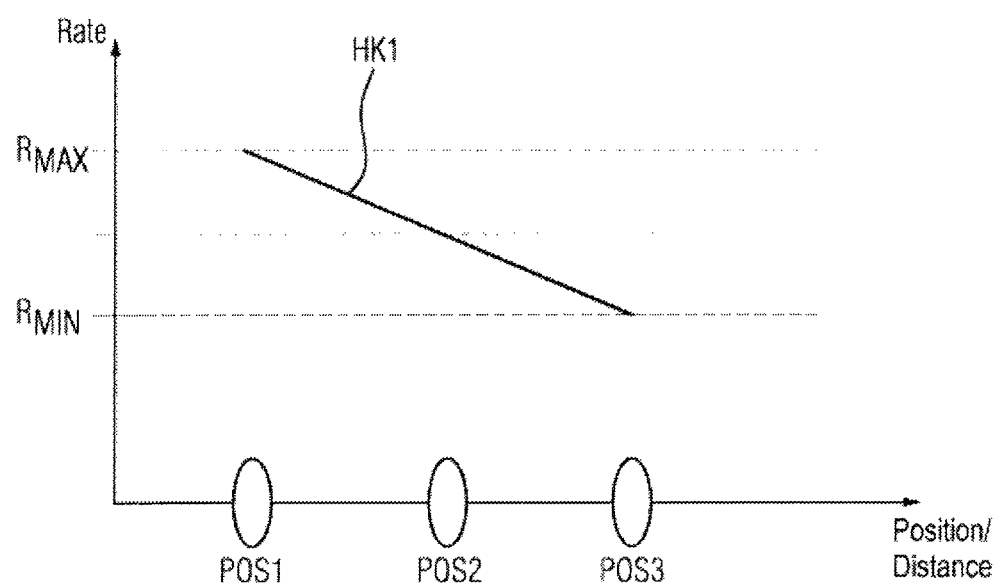
FIG. 2 shows a diagram illustrating the control of the emission of interrogation signals in accordance with the position.

Reference will now be made to FIG. 2, in which a diagram illustrating the control of the emission of localization signals by the vehicle-side control device is illustrated. By analogy with the right-hand section in FIG. 1, three exemplary positions POS1, POS2 and POS3 which the mobile identification transmitter IDG can assume are now also shown in FIG. 2. In this context, all three positions are located within an approach range around the vehicle FZ. This means that within this approach range the identification transmitter IDG can receive the interrogation signal or signals ANO and the localization signals LS1, with the result that an interrogation/response dialogue can occur between the vehicle FZ and the identification transmitter IDG.

The position POS3 will be assumed here to represent the position of the vehicle FZ which is furthest away within the approach range, while the position POS1 is intended to represent the closest possible position of the identification transmitter IDG with respect to the vehicle.

If the vehicle FZ is in a shut-down or parked state, it will emit interrogation signals ANO with a specific field strength at regular intervals or at specific times. Mobile identification transmitters, such as the identification transmitter IDG, can detect these signals correctly when they are located within the approach range ANB.

It will now be assumed that the mobile identification transmitter IDG has moved quickly, together with a user (for example from right to left in the figure) toward the vehicle and is now located at the position POS2, that is to say within the approach range ANB. Now a (further) interrogation signal ANO is emitted by the vehicle FZ or the vehicle-side control device STE via the antenna ANF. This interrogation signal ANO can be received by the mobile identification transmitter IDG, and will subsequently generate, by means of the identification-transmitter-side control device STI, a corresponding response signal and send it back by means of the identification-transmitter-side transceiver device SEI. The response signal AWO then contains an identification code CO. The response signal AWO which is emitted by the mobile identification transmitter IDG is finally received by the antenna ANF and passed on to the control device STE. This then checks, on the basis of the transferred identification code CO, the association of the mobile identification transmitter IDG with the vehicle FZ and in the case of successful checking it will activate an illumination device BLE (such as for example a headlamp or a flashing indicator device of the vehicle) so that the latter outputs a light signal LS as welcome lighting for the user who is carrying the mobile identification transmitter IDG on his person. The implementation of the welcome lighting is merely optional and can also be omitted.

If the identification code CO is correct, the vehicle-side control device STE can start to emit localization signals LS1 with a predetermined field strength IO at specific time intervals. The purpose of the emission of the localization signals LS1 with a predetermined field strength is that a mobile identification transmitter IDG located in the approach range ANB measures the field strength or the intensity of the localization signals at its current location and sends back the, for example, digitized intensity value or RSSI (received signal strength indication) value to the vehicle in the form of the value RSI with a corresponding response signal. A value RS1 which is received via the antenna ANF and the vehicle-side control device STE is finally fed to the position-determining device PBE, so that the latter determines, in the function of the evaluation device on the basis of the known field strength IO with which the localization signals are emitted and on the basis of the field strength values RS1, measured by the identification transmitter IDG, of the localization signals at the current location of the identification transmitter IDG, the distance and therefore (in particular when there are multiple vehicle-side antennas) also that of the identification transmitter IDG, from the vehicle FZ.

The particular feature of the actuation of the vehicle-side control device STE with respect to the frequency of the emission of the localization signal LS1 is illustrated in FIG. 2 here. It is assumed here that an identification transmitter which is still located far from the vehicle or the user who is carrying said transmitter still cannot trigger any vehicle function immediately. For this reason, the frequency of the emission of localization signals LS1 by the vehicle-side control device STE is set to a minimum value RMIN, for example for an identification transmitter IDG which is located at the position POS3, i.e. at the furthest away, outermost edge of the approach range ANB. However, if the identification transmitter IDG, continues to move in the direction of the vehicle, i.e. in the direction of the position POS2 or POS1, it is apparent from the frequency curve HK1 in FIG. 2 that as the distance from the vehicle become smaller the frequency of the emission of localization signals LS1 increases up to a maximum value RMAX. The latter is then set at the position which is closest to the vehicle, i.e. when the mobile identification transmitter IDG is located with its user directly in front of the vehicle or in front of a door of the vehicle. In this position POS1, the triggering of a specific vehicle function such as the unlocking of the vehicle door is expected directly, with the result that here, as it were, very good "time resolution" of the position of the identification transmitter is to be sensed, in order to ensure reliable and correct operation of the access device ZV.

While a linear profile of the frequency curve HKA is shown in FIG. 2, it is also conceivable to define another profile, such as a logarithmic profile. It is to be noted here that the frequency is to be equated with the rate, that is to say the number of emitted localization signals per predetermined unit of time.

Through this control or adaptation of the frequency of the emission of localization signals it is possible to achieve a saving in current on the part of the vehicle, as well as at the identification transmitter, if the identification transmitter is not located directly on the vehicle but somewhat further away, since the frequency of the emission of localization signals is then reduced here in comparison with the maximum rate RMAX, as result of which, on the one hand, the power consumption in the vehicle and the identification transmitter is reduced, and also the respective transmission/reception electronics in the vehicle and the identification transmitter are relieved of loading, since they are heated up less.

While for detailed determination of the location at the position POS1, a maximum rate of one localization signal per 250 ms can be defined, this rate can turn out to be lower for the position POS3, for example by a quarter, with the result that, for example, one localization signal per second is emitted.

In addition to the fact that the frequency of the rate of the emission of the localization signals is defined in accordance with the position or the distance of the identification transmitter IDG, it is also conceivable to adapt the frequency of the emission of the localization signals LS1 in accordance with the time for which the identification transmitter IDG is present at a location. In this respect, reference is made, for example, to FIG. 3. The latter shows a diagram with a dependence of the time for which the identification transmitter IDG is present with respect to the frequency of the emission of localization signals by the vehicle-side control device STE. Whereas in the case of a brief presence at the (same) location of the identification transmitter IDG, i.e. up to a time period T1, the frequency of the emission of the localization signals is at a maximum value of the rate of RMAX (for example one localization signal per 250 MS), this frequency of the emission of the localization signals can drop, in accordance with the frequency curve HK2, as far as a minimum frequency value RMIN if the time for which the identification transmitter IDG is present lasts at least for a time present of one time interval T3. In this way, there can be a saving in current again both in the vehicle and at the identification transmitter.

In addition to the fact that the frequency of the emission of the localization signals LS1 is adapted in accordance with the time for which the identification transmitter IDG is present at a location, it is also conceivable to adapt the frequency of the emission of the localization signals LS1 in accordance with the time for which the identification transmitter is present in a specific range around the vehicle. For example, the approach range around the vehicle can serve as the range here. It is therefore also possible to make the frequency dependent in a more general way on the time present in the vicinity of the vehicle since the detected approach.

A further aspect of the adaptation of the frequency of the emission of localization signals is based on the idea that although it is conceivable for a mobile added identification transmitter still to be located far away from the position or at the distance from the vehicle, with the result that basically a low frequency of the emission would be necessary here, when there is a rapid speed of approach to the vehicle, position-dependent triggering of a vehicle function would no longer occur. Therefore, according to the illustration in FIG. 4, allowance is made for this fact that a speed component is also included here as a further possibility, also as an additional parameter for the position-dependent adaptation of the frequency of the emission.

Figure 4:
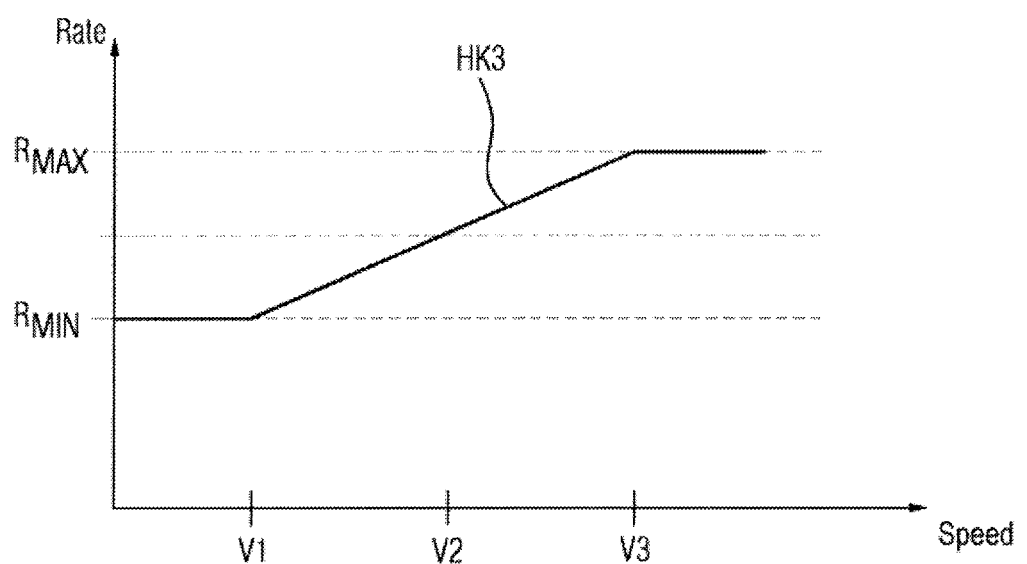
FIG. 4 shows a diagram illustrating the control of the emission of interrogation signals in accordance with the speed of the change of position.

With respect to FIG. 4, a minimum frequency value RMIN of the emission of the localization signals is also to be defined, for example at a low speed of the change in position up to a value of V1 (in particular with respect to an approach of the identification transmitter to the vehicle). If the speed of the mobile identification transmitter increases further, up to a value V3, the maximum frequency of the emission of the localization signals RMAX is set starting from this value of a change in position of the identification transmitter, since it is to be expected that the identification transmitter or the user carrying it will arrive soon at the vehicle, wherein the triggering of specific vehicle functions, such as the abovementioned "welcome lighting" or an approach unlock, can possibly then occur.

While with respect to FIG. 4 it has been described in detail that the frequency of the emission of the localization signals can increase in accordance with the speed of the movement of the mobile identification transmitter toward the vehicle as shown by frequency curve HK3, the opposite case is also conceivable in which the frequency of the emission of the localization signals is adapted in accordance with the speed of the movement of the mobile identification transmitter away from the vehicle. Therefore, the frequency of the emission of the localization signals can be lowered when a change in position away from the vehicle is detected. In particular, the frequency can be correspondingly lowered in accordance with the speed away from the vehicle.

In practice, the case can also occur in that in the case of an access device not only one identification transmitter which is associated with the vehicle or the access device is located in the approach range around the vehicle (but rather a plurality of identification transmitters are located there), and can consequently receive the localization signals. In this case, the vehicle-side control device can calculate individually the frequency of the emission of the localization signals in accordance with one or more of the parameters specified above, on the basis of each individual identification transmitter. According to one variant, the maximum calculated frequency can then be used for that frequency of the emission of localization signals which is to be ultimately used, or according to a further variant the mean value of the calculated frequencies is used.

Figure 3:
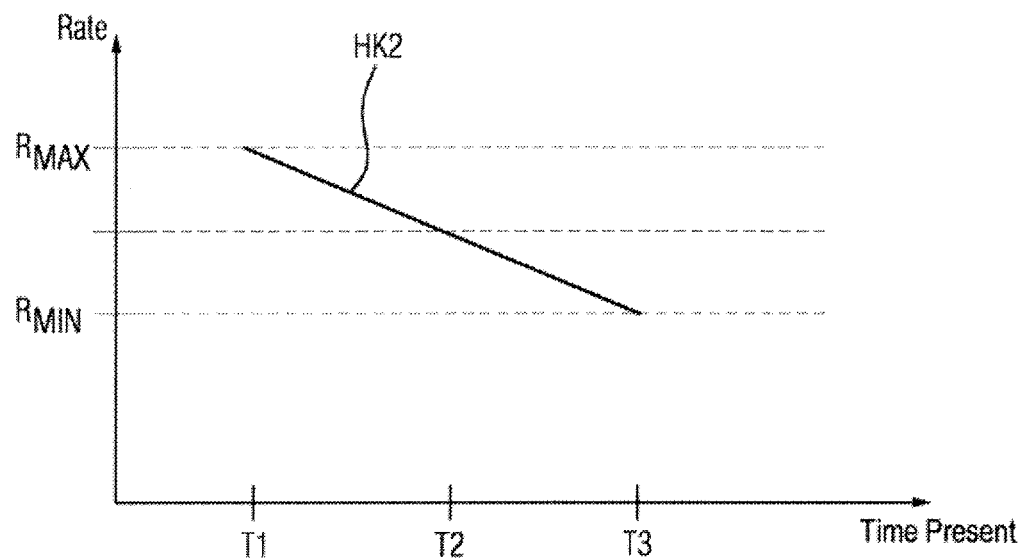
FIG. 3 shows a diagram illustrating the control of the emission of interrogation signals in accordance with the time present at a position.

All the adaptation possibilities which are illustrated in FIGS. 2-4 with respect to the frequency of the emission of localization signals, whether alone or in combination with one another, serve to reduce the power consumption and the access device ZV without adversely affecting the comfort of a satisfactory mode of functioning

The invention claimed is:

1. An access device for a vehicle, comprising:
a vehicle-side position-determining device for determining a position of a mobile identification transmitter with respect to the vehicle by emitting localization signals and a response of the mobile identification transmitter to the localization signals; and
a vehicle-side control device for emitting the localization signals to the mobile identification transmitter for determining the position thereof,
wherein the vehicle-side control device is configured to:
determine a speed at which the mobile identification transmitter changes its position,
determine a direction of travel of the mobile identification transmitter,
when the direction of travel of the mobile identification transmitter is determined to be towards the vehicle:
increase the frequency of the emission of the localization signals in response to a determination that the speed has increased,
decrease the frequency of the emission of the localization signals in response to a determination that the speed has decreased,
when the direction of travel of the mobile identification transmitter is determined to be away from the vehicle:
decrease the frequency of the emission of the localization signals in response to a determination that the speed has increased,
increase the frequency of the emission of the localization signals in response to a determination that the speed has decreased.

2. The access device as claimed in claim 1, in which the vehicle-side control device is configured to control the frequency of the emission of the localization signals in accordance with a distance between the mobile identification transmitter and the vehicle.

3. The access device as claimed in claim 1, in which the vehicle-side control device emits, for the determination of position, a corresponding localization signal and receives, from the mobile identification transmitter, a corresponding response signal which contains a value which permits the reception field strength, measured at the location of the mobile identification transmitter, to be inferred.

4. The access device as claimed in claim 1, in which the vehicle-side position-determining device carries out a position determination on the basis of a transit time measurement.

5. The access device as claimed in claim 4, in which the vehicle-side position-determining device carries out the transit time measurement by a radio-based UWB transmission.

6. The access device as claimed in claim 1, in which the vehicle-side control device is also configured to trigger a predetermined vehicle function in accordance with the position of the mobile identification transmitter with respect to the vehicle, the change in position of the mobile identification transmitter with respect to the vehicle and/or the time for which the mobile identification transmitter is present at a location.

7. The access device as claimed in claim 1, in which the vehicle-side control device is configured to emit an interrogation signal for authenticating the mobile identification transmitter, and to receive a response signal of the mobile identification transmitter with an identification code.

8. A vehicle having an access device as claimed in claim 1.

9. A method for operating an access device of a vehicle, comprising:
   emitting localization signals for determining a position of a mobile identification transmitter;
   determining the position of the mobile identification transmitter on the basis of a response of the mobile identification transmitter to a respective localization signal; and
   adapting a frequency of the emission of the localization signals in accordance with the position of the mobile identification transmitter with respect to the vehicle,
   wherein the frequency of the emission of the localization signals is adapted to:
      determine a speed at which the mobile identification transmitter changes its position,
      determine a direction of travel of the mobile identification transmitter,
      when the direction of travel of the mobile identification transmitter is determined to be towards the vehicle:
         increase the frequency of the emission of the localization signals in response to a determination that the speed has increased,
         decrease the frequency of the emission of the localization signals in response to a determination that the speed has decreased,
      when the direction of travel of the mobile identification transmitter is determined to be away from the vehicle:
         decrease the frequency of the emission of the localization signals in response to a determination that the speed has increased,
         increase the frequency of the emission of the localization signals in response to a determination that the speed has decreased.

* * * * *